US011522715B2

(12) United States Patent
Stow

(10) Patent No.: US 11,522,715 B2
(45) Date of Patent: Dec. 6, 2022

(54) METHODS FOR PROCESSING AND VERIFYING A DOCUMENT

(71) Applicant: Ordnance Survey Limited, Southampton (GB)

(72) Inventor: David Stow, Southampton (GB)

(73) Assignee: Ordnance Survey Limited, Southampton (GB)

(*) Notice: Subject to any disclaimer, the term of this patent is extended or adjusted under 35 U.S.C. 154(b) by 629 days.

(21) Appl. No.: 16/532,687

(22) Filed: Aug. 6, 2019

(65) Prior Publication Data

US 2020/0059368 A1 Feb. 20, 2020

(30) Foreign Application Priority Data

Aug. 15, 2018 (EP) .................................... 18189198

(51) Int. Cl.
*H04L 9/40* (2022.01)
*H04L 9/32* (2006.01)
(Continued)

(52) U.S. Cl.
CPC ............ *H04L 9/3247* (2013.01); *G06K 1/121* (2013.01); *G06V 30/40* (2022.01); *H04L 9/3236* (2013.01);
(Continued)

(58) Field of Classification Search
CPC ..... H04L 9/3247; H04L 9/3236; G06V 30/40; G06V 30/10; G06K 1/121; H04N 1/32283; H04N 1/32325; G06F 40/163
See application file for complete search history.

(56) References Cited

U.S. PATENT DOCUMENTS 6,645,075 B1 * 11/2003 Gatto .................. G07F 17/3262
463/16
7,725,704 B1 * 5/2010 Beaverson ............ G06F 9/4401
713/1
(Continued)

FOREIGN PATENT DOCUMENTS

CN 107453874 A 12/2017
EP 0676877 A2 10/1995

OTHER PUBLICATIONS

Jan. 31, 2019—(EP)—Extended Search Report—App 18189198.7.
Dec. 7, 2021—EP Examination Report—EP Application No. 18189198.7.

*Primary Examiner* — Ghodrat Jamshidi
(74) *Attorney, Agent, or Firm* — Banner & Witcoff, Ltd.

(57) ABSTRACT

Embodiments described herein provide a computer-implemented method of creating a digest of a document. The document to be processed and analysed may be a physical document, or it may already be in a digital form. In the case of starting from a physical document, the document is first scanned, so as to obtain an image of the document. The digital document is then processed using an algorithm or function to obtain one or more datasets comprising a plurality of position independent values. Each of the datasets may correspond to a different line of text or field of text within the document. The one or more datasets are then encoded, the encoded data being used to generate a digest associated with the document, and wherein the digest comprises a plurality of short hashes corresponding to each dataset. The generated digest can then be used to print a digital signature on the document, which can be used to later verify the authenticity of the document or a copy thereof.

18 Claims, 9 Drawing Sheets

(51) Int. Cl.
  *G06K 1/12*    (2006.01)
  *H04N 1/32*    (2006.01)
  *G06V 30/40*   (2022.01)
  *G06F 40/163*  (2020.01)
  *G06V 30/10*   (2022.01)

(52) U.S. Cl.
  CPC ..... *H04N 1/32283* (2013.01); *H04N 1/32325* (2013.01); *G06F 40/163* (2020.01); *G06V 30/10* (2022.01)

(56) References Cited

U.S. PATENT DOCUMENTS

| | | | | |
|---|---|---|---|---|
| 9,614,675 | B2* | 4/2017 | Georgiev | H04L 9/30 |
| 9,641,555 | B1* | 5/2017 | Brisebois | G06F 21/6245 |
| 10,528,731 | B1* | 1/2020 | Syme | G06F 21/565 |
| 10,769,200 | B1* | 9/2020 | Lin | G06V 40/20 |
| 2003/0018878 | A1* | 1/2003 | Dorward | G06F 16/137 |
| | | | | 714/E11.12 |
| 2004/0164154 | A1* | 8/2004 | Aigeldinger | G06K 19/06028 |
| | | | | 235/462.01 |
| 2004/0169366 | A1 | 9/2004 | Duffell et al. | |
| 2008/0052575 | A1* | 2/2008 | Jang | G01R 31/31926 |
| | | | | 714/724 |
| 2008/0301815 | A1 | 12/2008 | Lauter et al. | |
| 2014/0012829 | A1* | 1/2014 | Bain | G06F 16/90344 |
| | | | | 707/698 |
| 2016/0283749 | A1* | 9/2016 | Yoon | H04L 9/0872 |
| 2017/0132079 | A1* | 5/2017 | Khadiwala | G06F 3/0619 |
| 2017/0286765 | A1* | 10/2017 | Rodriguez | H04L 9/3239 |
| 2018/0025159 | A1* | 1/2018 | Jacquin | G06F 21/575 |
| | | | | 713/2 |
| 2018/0089369 | A1* | 3/2018 | Semenyuk | G16B 20/00 |
| 2019/0215325 | A1* | 7/2019 | Glass | H04L 67/12 |
| 2019/0258854 | A1* | 8/2019 | Hosabettu | G06V 30/414 |

* cited by examiner a8fcb98bce0cba8
99514f01dc622c5
8e23cb4b75bcea
80648e1ba8825d
7e7368

Figure 2

CERTIFIED COPY OF AN ENTRY OF DEATH  GIVEN AT THE GENERAL REGISTER OFFICE

Application Number 123456789/4

| REGISTRATION DISTRICT | | | | Anytown | | County of Anyford | |
|---|---|---|---|---|---|---|---|
| No. | When and where died | Name and surname | Sex | Age | Address | Cause of death | Name and address of informant | When registered | Registrar |
| 285 | 20-Feb-2016 St. Paul's Hospital Anytown | John Henry SMITH | Male | 75 years | 1 The Street Anytown Anyford AA11 2BB | Cerebral haemorrhage Hypertension Certified by A. A. Jones | F Taylor 2 The Road Anytown Anyford AA22 3BB | 22-Feb-2016 | A. James |

CERTIFIED to be a true copy of an entry in the certified copy of a Register of Deaths in the District above mentioned Given at the GENERAL REGISTER OFFICE, under the Seal of the said Office, the 21st day of March 2017

CAUTION: THERE ARE OFFENCES RELATING TO FALSIFYING OR
ALTERING A CERTIFICATE AND USING OR POSSESSING A FALSE CERTIFICATE

Figure 3A

CERTIFIED COPY OF AN ENTRY OF DEATH

GIVEN AT THE GENERAL REGISTER OFFICE
Application Number 123456789/4

| REGISTRATION DISTRICT | Anytown | | County of Anyford | |
|---|---|---|---|---|

| No. | When and where | Name and surname | Sex | Age | Address | Cause of death | Name and address of informant | When registered | Registrar |
|---|---|---|---|---|---|---|---|---|---|
| 286 | 20-Feb-2016 St. Paul's Hospital Anytown | John Henry SMITH | Male | 75 years | 1 The Street Anytown Anyford AA11 2BB | Cerebral haemorrhage Hypertension Certified by A. A. Jones | F Taylor 2 The Road Anytown Anyford AA2 3BB | 22-Feb-2016 | A. James |

CERTIFIED to be a true copy of an entry in the certified copy of a Register of Deaths in the District above mentioned Given at the GENERAL REGISTER OFFICE, under the Seal of the said Office, the 21st day of March 2017

CAUTION: THERE ARE OFFENCES RELATING TO FALSIFYING OR ALTERING A CERTIFICATE AND USING OR POSSESSING A FALSE CERTIFICATE

Figure 3B

METHODS FOR PROCESSING AND VERIFYING A DOCUMENT

CROSS-REFERENCE TO RELATED APPLICATIONS

This application claims priority to European patent application EP18189198.7, filed Aug. 15, 2018.

FIELD

Aspects described herein relate to methods of generating a document digest for digitally signing a physical document and verifying a digitally signed document.

BACKGROUND

The forging or editing of physical documents is an important issue to be vigilant about in the field of document security. Contracts, deeds or official copies of entries in a legal register are just some examples of documents that may be prone to tampering, which can then have serious consequences to the document owner or a signing party, for example. It is therefore imperative to ensure that tampering of such a document may be easily and accurately recognised and located.

US 2009/0328143 discloses a document authentication method in which a document is segmented to extract any segments containing a physical signature, and to further extract segments containing images or text. Authentication data generated from the different segments is encoded in a barcode.

US 2017/0286765 discloses a method storing virtual personal identifiable information. The method involves capturing an image of the document, extracting information or characteristics from the document and hashing them, and subsequently searching a digest table for a match of the hashed information or characteristics, so as to authenticate the document.

Such methods offer allow a previously-recorded document to be authenticated. However, there is a high likelihood that when the physical document is scanned to be authenticated, it is not aligned with the scanner in the same manner in which it was aligned the first time. The physical document may have also undergone some wear and tear that reduces the quality of the scan. There exists, therefore, a need for a method of authenticating a physical document which is independent of the manner in which the document is scanned, and the condition of the document.

SUMMARY

Embodiments and aspects described herein provide a computer-implemented method of creating a digest of a document. The document to be processed and analysed may be a physical document, or it may already be in a digital form. In the case of starting from a physical document, the document is first scanned, so as to obtain an image of the document. The digital document is then processed using an algorithm or function to obtain one or more datasets comprising a plurality of position independent values. Each of the datasets may correspond to a different line of text or field of text within the document. The one or more datasets are encoded, wherein the encoding process may include simplifying the data, for example to reduce the amount of data or to reduce the complexity of the data. The encoded data is used to generate a digest associated with the document, the digest comprising a plurality of short hashes corresponding to each dataset. That is to say, a short hash is generated for each line of text or field of text within the document. The manner of processing and encoding the image data removes the variability associated with the position or orientation of how the document is scanned, as well as the differences in interpretation that may arise because of this variability. Furthermore, the manner of processing and encoding also enables the generation of a digest that is tolerant to wear and tear of the document it is printed on, such that it can still be used to verify the authenticity of the document regardless of the condition that the document is in.

According to a first aspect described herein, a computer-implemented method of creating a digest of a document is disclosed, the method comprising the steps of:
  obtaining an image of the document;
  processing the image to obtain one or more datasets, wherein the one or more datasets comprises a plurality of position independent values;
  encoding the one or more datasets; and
  generating a digest associated with the document therefrom, wherein the digest comprises one or more hash functions corresponding to a respective dataset.

In the case of a physical document that is first scanned to obtain an image, the digest associated with the document is independent of scan positioning or alignment, as well as some variability of the document itself. Furthermore, the process used to generate the digest is such that it can be easily recreated for authentication even if the document on which it has been printed has suffered wear and tear. Furthermore, a short hash function is generated for each dataset within the document, for example, each line of text or field of text, which can be later used in authentication to identify and locate any changes that have been made to the document. In this respect, the digest may further comprise position data associating the one or more hash functions with a respective dataset. That is to say, the digest includes information that maps each hash function to a particular position within the document, for example, a specific field or line of text.

The encoding may comprise converting the one or more datasets into a simplified format. In this respect, the encoding may comprises reducing the number of position independent values and/or reducing the complexity of the position independent values. For example, removing any spaces or removing any values that are commonly confused. Alternatively, values that are commonly confused, such as O or 0, may be replaced with another value.

The encoding may comprise one or more from the list of: removal of styling; standardisation of commonly-confused characters; removal of excess white space; and enforcing consistent line termination.

Processing the image may comprise transforming the image using optical character recognition.

Each dataset may be one of: a line of text; a field; a date; a time; a telephone number; or a serial number.

In the case of field identification, time and processing power is saved by the fact that areas of the document outside of the fields of interest, such as standard text on the document, are not analysed unnecessarily.

The method may further comprise the step of:
  applying a signing authority private key to the digest to generate a signature digest.

A visual representation of the signature digest may be printed on the document.

A visual representation of the digest printed on the physical document further secures the document against forgery, as it will be close to impossible to tamper with the document itself as well as the visual representation in a way that ensures the document changes correspond to the changes made to the visual representation.

Printing a visual representation on the document also increases convenience for assessing the authenticity of the document, as no remote retrieval of the digest is required.

The visual representation may comprise a 1 dimensional or 2 dimensional barcode, such as a QR code.

According to a further aspect described herein, a method of verifying a digitally signed document is provided, the method comprising the steps of:

obtaining an image of the document;

processing the image to obtain one or more datasets, wherein the one or more datasets comprises a plurality of position independent values;

encoding the one or more datasets;

generating a new digest associated with the document therefrom, wherein the new digest comprises one or more hash functions corresponding to a respective dataset;

retrieving a digital signature associated with the document;

applying a public key to the digital signature to retrieve an original digest associated with the document, wherein the original digest comprises one or more further hash functions corresponding to one or more further datasets, wherein the one or more further datasets corresponds to an original version of the document;

comparing the new digest and the original digest; and verifying the document in dependence thereon.

As such, to verify the authenticity of a document, a new digest is generated using the methods described previously and compared to the digest that was generated for the original version of the document. These digests can then be compared to determine whether the document to be verified matches the original document, that is to say, whether it has been tampered with or falsified.

The document may be verified if the new digest matches the original digest; and the document may not be verified if the new digest does not match the original digest. If the new digest does not match the original digest, the format of both digests is such that the source of the mismatch can be identified and located.

If the document is not verified, the method may further comprise identifying a location of a discrepancy between the one or more datasets and the one or more further datasets, that is to say, whether there are any differences between the content of the two documents. In this respect, the identifying the location of the discrepancy may comprise comparing the one or more hash functions to the one or more further hash functions. As the hash functions are generated in dependence on the datasets within the documents, that is, each line or field of text, if one of the further hash functions corresponding to the datasets in the original version of the document does not match one of the hash functions corresponding to the datasets in the document to be verified, it is possible to identify which of the datasets has been changed. In this respect, each of the hash functions may have position data associated therewith such that it is possible to quickly and efficiently map each hash function to its respective dataset. In doing so, it is possible to automatically identify and locate the text that has been changed. To enable the discrepancy to be located, the new digest may further comprise position data associating the one or more hash functions with a respective dataset in the document to be verified, and the original digest may further comprise position data associating the one or more further hash functions with a respective dataset in the original document.

According to a further aspect described herein, a system comprising a processor; and a computer readable medium storing one or more instruction(s) arranged such that when executed the processor is caused to perform the methods described above.

BRIEF DESCRIPTION OF THE DRAWINGS

Further features and advantages will become apparent from the following description of embodiment thereof, presented by way of example only, and with reference to the accompanying drawings, wherein like reference numerals refer to like parts, and wherein:

FIG. 2 is a diagram showing steps of generating a document digest according to one or more illustrative aspects described herein;

FIG. 3A is a "set of fields" type document according to one or more illustrative aspects described herein;

FIG. 3B is a diagram illustrating the printing of field markers on the "set of fields" type document according to one or more illustrative aspects described herein;

DETAILED DESCRIPTION

Figure 1:
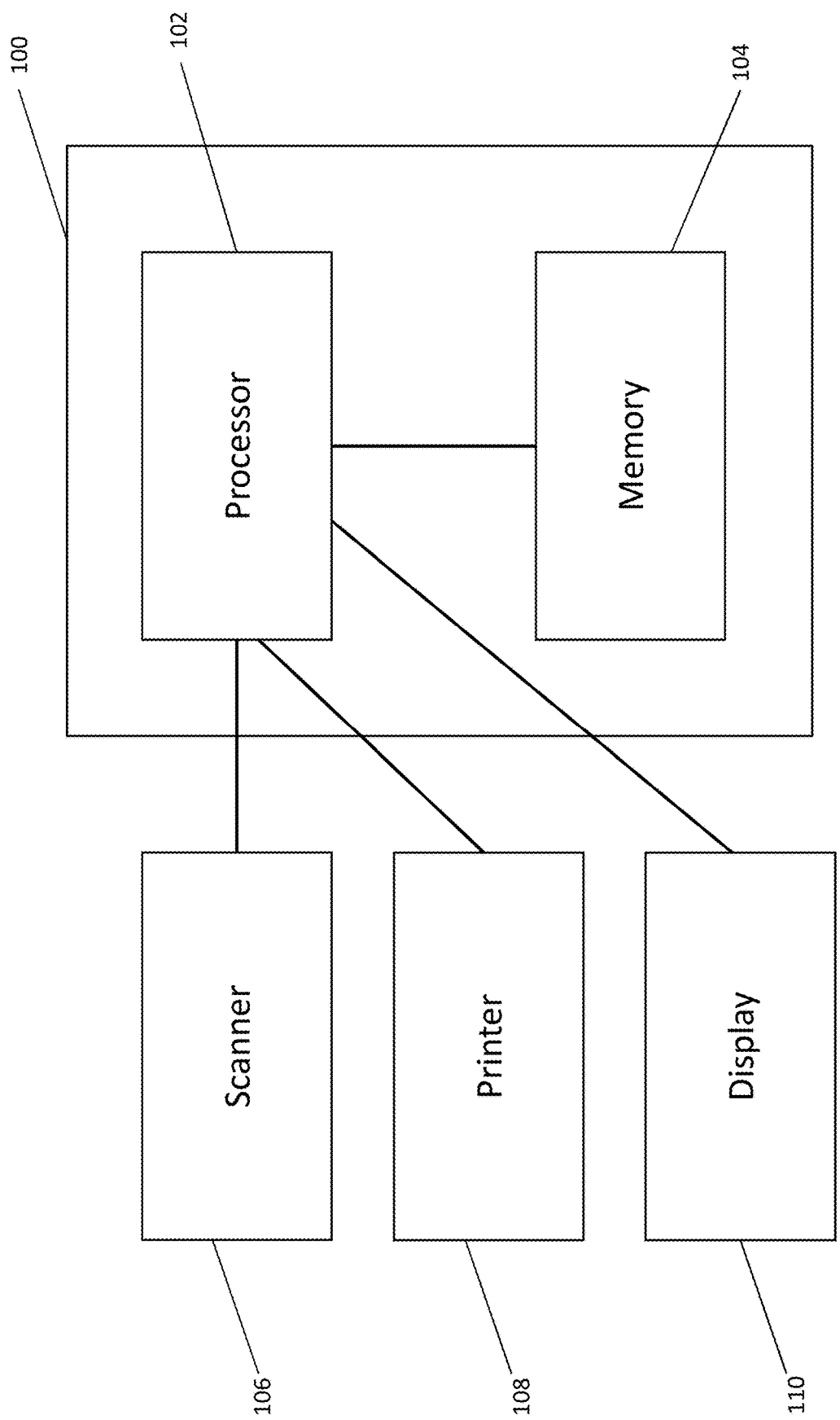
FIG. 1 is a block diagram showing typical components that may be used to carry out one or more illustrative methods disclosed herein.

Embodiments and aspects described herein provide a computer-implemented method of creating a digest for a document. The method comprises scanning the document, so as to obtain image data of the document. The image data is transformed using an algorithm or function into text data. Such a transformation algorithm or function may involve the use of optical character recognition to process the image data, for example. The resulting text data is encoded so as to simplify the text data, thereby reducing the data down to a simplified format. This may mean that the amount of data is decreased, or that the amount of information contained in the data is decreased, or both, for example. Such simplification may include one or more of: removal of styling; standardisation of commonly-confused characters; removal of excess white space; and enforcing consistent line termination. This simplification means that if a physical document is first scanned to obtain an initial digest, in addition to any subsequent scanning at a later time to obtain a subsequent digest for comparison with the initial digest (such methods are described later in more detail), the subsequent digest is not subject to variability in how the document is scanned, or variability in the document itself. Such variability in how the document is scanned may include the orientation or positioning of the document in the scanner, which may result in certain characters being interpreted differently by the transformation algorithm or function (for example, the letter O may be interpreted as the number 0). Variability in the document itself over time may arise due to age-related wear, staining, creasing or tears, for example. The original document may also be copied, meaning that copying artefacts may exist on copies of the document. By simplifying the text, one is reducing the content of the document to its core substance, such that the process is not affected by variations between two scans (or at least, the extent to which it is affected is significantly reduced). The simplified data is used to generate a digest associated with the document.

A further embodiment allows specific regions to be identified in the document. Such regions may be individual lines of text, or fields. In the case of a more complex document, with multiple fields at multiple x-y positions on the document, this allows for the transformation and simplification algorithms to operate in the confines of the identified fields. This helps to avoid errors in the generation of the digest, which may result if (a) non-text objects are interpreted to be text objects, or (b) standard text in the document is unnecessarily analysed and processed.

A further embodiment provides for storage or recordal of the document digest. It may be particularly desirable to record the document digest when the document is first scanned, and hence at this point it is known that the document is authentic. The document digest resulting from a subsequent scan can therefore be compared to the recorded document digest to subsequently authenticate the document. As a further option, the document digest may be printed on the document itself. It may be printed as a 1d or 2d barcode, such as a QR code or a linear barcode, for example. This printing offers the security that it is close to impossible to tamper with the document itself, and also tamper with the 2d barcode in such a way that corresponds to the changes made to the document. It also offers the convenience of having the appropriate document digest printed directly on the document itself, meaning that no remote retrieval of the digest is required.

As mentioned above, a document's authenticity may be tested by comparing the digests of the document at two points in time. A document digest corresponding to a point in time when the document was definitely completely authentic, such as when the document was first drafted, or at a point of subsequent authentication, can be compared to a document digest from another point in time. If the first document digest matches the second document digest, the document at the second point in time will have been shown to match the document at the first point in time, and hence, if the document at the first point in time is known to be authentic, the document at the second point in time will have been shown to be authentic. Likewise, if the document digests do not match, then at least some differences exist between the document at the first point in time and the second point in time, and its authenticity is therefore in doubt and should be queried. The content and form of the digest also makes it possible to pinpoint where in the document the difference between the document at the first point in time and second point in time is located.

Further embodiments provide a method of digitally signing a document. A private key associated with the signing authority is applied to the initial document digest to generate a signature digest. This signature digest may be stored or printed on the document, as described above. This signed document may be authenticated by reading the stored or printed signature digest and applying a signing authority public key to the signature digest to generate the original document digest. In parallel, a document digest may be generated directly from the document using the method discussed above, and the directly obtained document digest may be compared with the document digest obtained from the signature digest. As above, if the digests match, the digitally signed document is authenticated. If the digests do not match, the authenticity of the digitally signed document is in doubt and should be queried. This may be an indication that either the document has been tampered with, or the digital signature has been tampered with.

FIG. 1 is a block diagram of a computer system which provides a platform for illustrative embodiments described herein. In particular a computer 100 is provided, which has a processor 102 and a memory 104. The system is also provided with a scanner 106, a printer 108 and a display 110. The scanner 106 is provided for scanning physical documents. The printer 108 is provided for printing a digest (described in more detail below) onto a document. The display 110 is provided for indicating to a user the outcome of a document authentication or verification process, e.g., whether the document in question has been authenticated or not.

Although the scanner 106, the printer 108 and the display 110 are each represented here as a device external to the computer 100, the each of the aforementioned devices may equally be integrated into the computer 100, or be partially internal and partially external to the computer 100. In the illustrated case that they are provided as external components to the computer 100 however, they are each connected to the processor 102 via an I/O interface (not shown).

FIG. 2 shows a process of generating a document digest in line with an illustrative embodiment. A physical document may be first scanned into the system using scanner 106, so as to create an image 202 of the document from which image data can be obtained. Alternatively, the document may already be in the form of a digital image 202. The image 202 of the document shown, and therefore any image data obtained from it, comprises a "block of text", meaning that the structure of the content of the document is quite simply a series of lines of text. The image 202 undergoes a transformation 204 in order to encode or simplify the content of the image 202. Firstly, the text is extracted from the image 202. For example, this text extraction may use optical character recognition techniques, though other methods of text extraction may also be employed. In this manner, the image 202 is transformed into a set of text data.

The text data then undergoes a further set of processing, in which it is simplified in some way. Simplification of the text data may involve removing all of the styling (italic, bold, underlining, etc.) from the text, and/or reducing the lines of text to a minimal character set, for example. Such a minimal character set may, for Latin text, be A-Z, a-z, 0-9 and punctuation marks—roughly equating to standard 7-bit ascii codes from 32-126, plus the codes necessary to support common symbols such as currency. As an example of consolidation to a minimal character set, "smart quotes" may be simplified to simple quotes ("). Further simplification algorithms may aim to remove or standardise commonly-confused characters—e.g., commonly-confused characters such as 0/O and I/l/1 may be replaced by a single character in their place. As an example, 0 and O will always be treated as O, and I, l and 1 will be treated as I. Alphabets may have a defined "common confusion" table of replacements for this purpose. Yet further simplification algorithms may aim to make the white space in the text data consistent by, for example, removing all white space between lines; removing all leading and trailing white space; and consolidating the spacing between words to a single space (no tabs). Further, consistent line termination may be enforced. For example, a CR-LF pair may be used at the end of each line so as to indicate the termination of the line in question.

Although a number of simplification methods have been described above, it will be appreciated that other such simplification algorithms and methods may equally be used.

The combination of the steps of transforming the image 202 into text data and simplifying the text data is indicated at 204. The resulting simplified text data 206 is then used to generate a document digest 208. Preferably, the document digest 208 is generated from a series of short (e.g. 16-bit long) hashes, generated, generally, for each line of the simplified text 206. The generation of a short hash for each line of the text will be key in enabling the location of any changed text during the verification step.

In order to prevent the fraudulent creation of a document that is capable of producing an identical digest and thus be incorrectly authenticated, as will be described in more detail below, it is important to ensure that new text cannot be engineered that generates the same short hash for a line of text as the original document. This is termed "collision resistance". In considering the algorithm to be applied to the line of text to generate a suitable short hash, there needs to be a balance between generating hashes that are "short" enough (e.g. 16 bits) to enable them to be combined into a digest small enough to be represented on the printed page, for example by means of a 2D barcode, whilst still providing sufficient collision resistance to prevent the engineering of valid text that generates the same short hash result.

In practice, engineering a new line of text that creates a required different meaning (for example, in the case of a contract, assigning the rights of an asset to a different party than that of the original document, or altering the value of the asset identified in the original document), has correct spelling, grammar and syntax, and still generates the same short hash is exceptionally difficult, even where the hash function exhibits quite poor collision avoidance, that is, it is of a form that has a higher chance of duplication. However, applying a simple lossless compression algorithm to the plain text to ensure that all bits in the bytes are being used (as this is not the case where the characters have been simplified to ascii codes 32-126), and then applying a 16-bit CRC checksum algorithm to create the short hash is sufficient to ensure that the short hash cannot be recreated from a fraudulent line of text.

A final "short hash of short hashes" may also be generated. The digest header will generally contain a digest type indicating the type of digest (block of text or set of fields, for example); an indicator of language; an indicator of alphabet used (e.g. Latin, Greek, Cyrillic, Japanese, etc.); an indicator of the simplification and short hash algorithm used; and the number of lines of text, and hence the number of short hashes expected. This header will be followed by the list of short hashes and the final short hash of short hashes. It is expected that the total digest size for a typical A4 page will be under 128 bytes.

Referring now to FIG. 3A, an image 302 of an alternative document to be processed and to undergo digest creation is shown. As can be seen, unlike the image 202 in the example shown by FIG. 2, the image 302 shows a document that comprises a number of fields 304, and not simply a number of lines of text. To process this image 302, it is therefore necessary to treat the digest type as a "set of fields", rather than a "block of text", although it will be appreciated that each field 304 within the set of fields may comprise one or more lines of text.

The image 302 undergoes a transformation into text data. This step differs from the corresponding step in a "block of text" digest in that each of the fields 304 must first be identified. The fields 304 may be identified automatically, based on certain characteristic features of a field 304, such as a black, rectangular border. Alternatively, the fields 304 may be identified and input manually by a user. Following the identification of the fields 304, the image data associated with each identified field 304 is transformed into text data. Such a transformation is performed as described above in relation to a "block of text" type, and will not be repeated here. Following the transformation for each field 304, the text data for each field 304 is simplified, as described above, to create simplified text data. Finally, a short hash is generated for each identified field 304, and the result is stored in a memory, a remote server, or printed on the document.

Figure 3C:
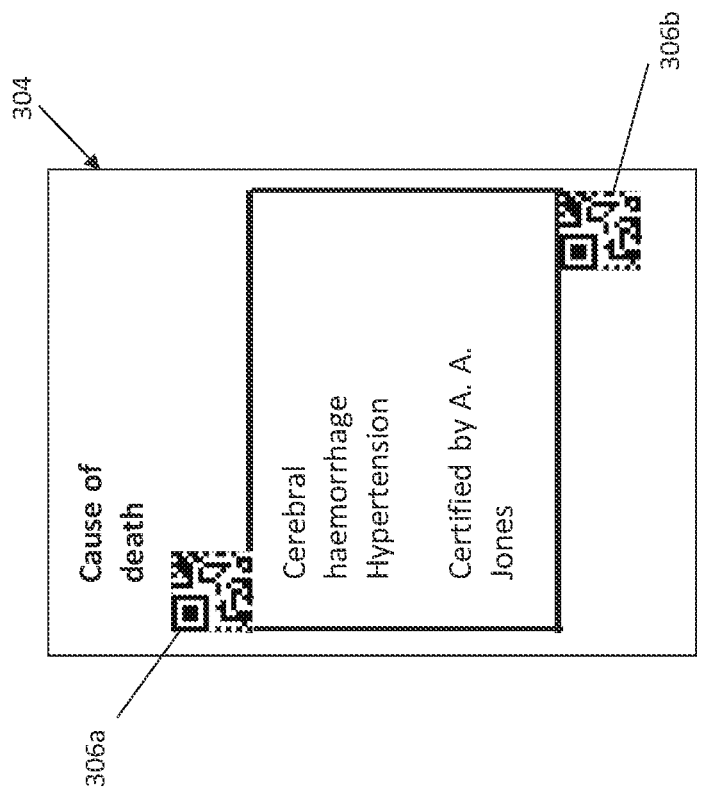
FIG. 3C is a diagram showing one field of the "set of fields" type document according to one or more illustrative aspects described herein.

FIG. 3B shows the printing of the field markers on the document. Each field is bordered by markers 306a, 306b. As shown in FIG. 3C, the location of each marker 306a, 306b sets one horizontal and one vertical border of the field 304. Two markers 306a, 306b are therefore the minimum number required to completely define a rectangular field 304.

The markers 306a, 306b contain data relating to the relative position of the field 304, and optionally the field type, short hash generation process used and the short hash itself. It is these field markers 306a, 306b that enable the location of differences between the original document and a tampered or fraudulent document to be identified.

An exception to this is where the field is defined as a "block of text". In this case the "block of text" approach described above will be applied to the field, and the field markers 306a and 306b will include the full set of short hashes for each line, plus a final short hash of short hash generated for use in the final digest 308 as the short hash for this field.

A digest 308 for the document as a whole may then also be generated containing for each field, the field relative position, field type, short hash algorithm applied and short hash, which may be additionally stored, or printed on the document.

The indicator of the relative position of the field may take the form of a x/y value, where y indicates vertical positioning of the field with 1 being used for the upmost field and x indicates the horizontal positioning of the field in a particular row. For example, the first field from the top of the document may have a y value of 1, and the first field from the left of the document may have an x value of 1. Using this system, the uppermost field of FIG. 3B (relating to Application number) may have the position of 1/1, while the next fields down (i.e. the consecutive fields beginning with column number and ending with signature of registrar) may have positions from 1/2 through to 10/2. The next entry down from that (relating to the date) may have a position of 1/3.

The type of digest (block of text; set of fields) may be manually selected when the document is scanned into the system. Alternatively, the system may automatically determine the most appropriate digest type to use, based on the general layout of the document. Alternatively still, the system may select the "set of fields" digest type by default. In this case, if a "block of text" document is provided, the entire document may be treated as a single field, meaning that the methods of processing for the "set of fields" digest type are still applicable. Critical data fields such as dates, serial numbers or telephone numbers may also be identified within the document, and may be treated as separate fields themselves. It is beneficial to identify dates, serial numbers and telephone numbers as separate fields as it is possible for these to be altered to certain other values whilst generating the same short hash, as the alphabet is reduced to 0-9 and other characters used commonly in numeric fields, such as spaces, dashes and slashes. A longer hash may therefore be required, such as a 32-bit or 64-bit hash. The system of allowing fields to be identified, isolated and processed separately enables digests for a wide range of documents (beyond standard text documents or variable field documents) to generated, such as maps and schematics, for example.

Figure 4:
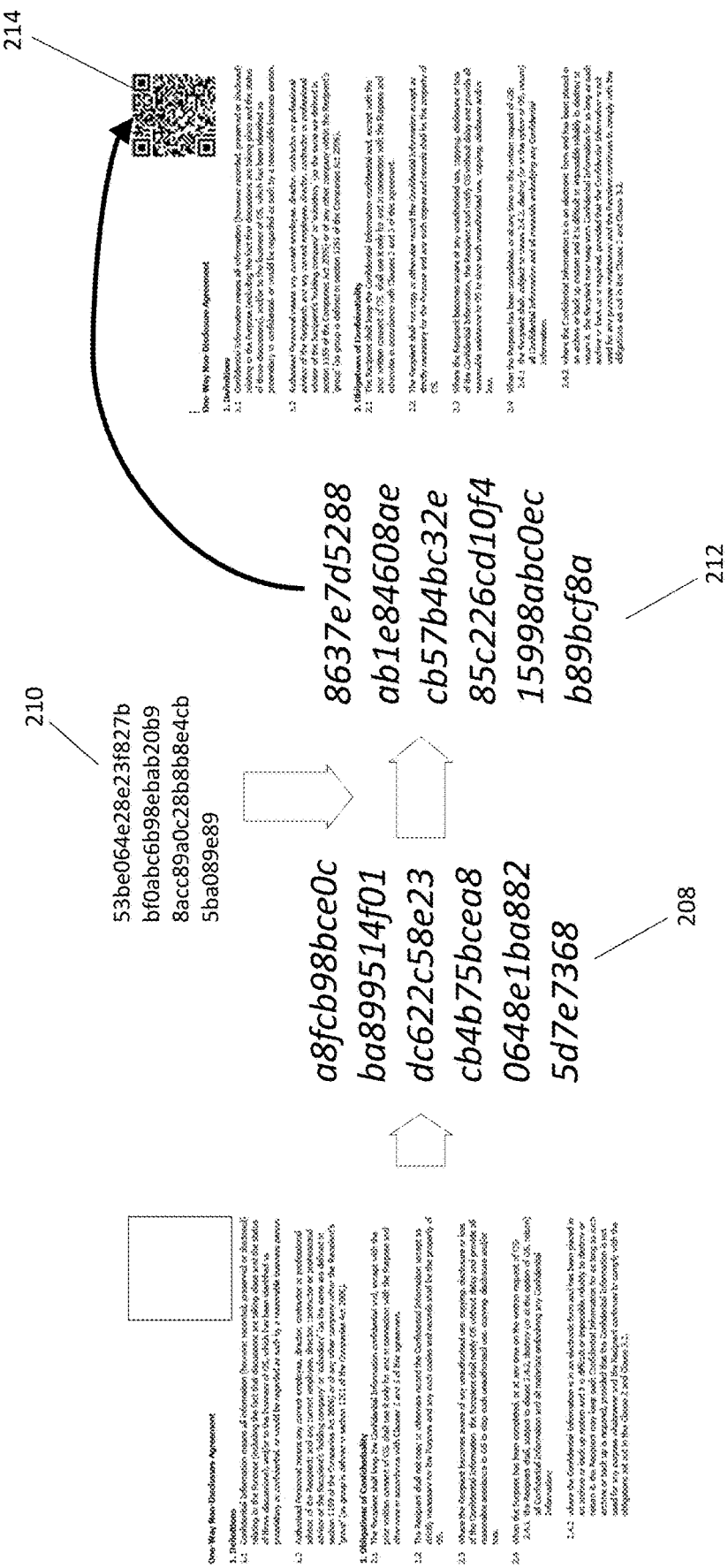
FIG. 4 is a diagram showing the steps of digitally signing a document according to one or more illustrative aspects described herein.

A further embodiment allows for a party to digitally sign a document. A method of digitally signing a document is illustrated in FIG. 4. As described above, a scan of a document may be taken so as to create an image of the document 202, if a digital version of the document 202 is not already available. A document digest 208 is generated using the method described above. A signing authority private key 210 is applied to the document digest 208 so as to generate a signature digest 212. The resulting signature digest 212 will contain data relating to the digest type; the contents of the digest itself, encrypted with the certifying party's private key; a certifying party key identifier, for example, a unique identifier, identifying the certifying party, the key that the certifying party is using and the digest creation algorithm; and metadata signed by a trusted third party. This metadata contains the certifying party key ID, the date of the signature and the digest type, encrypted using a central trusted third party's private key. The trusted third party may be a certificate authority or a provider of the digital signing service, for example. This enables certifying parties to issue revocation data for compromised private keys. As with a regular document digest 208, the signature digest 212 may also be stored remotely or in a local memory, or printed on the document in the form of 1d or 2d barcode 214, for example. It will however be appreciated that the signature digest 212 may be printed on the document by some other suitable machine readable means.

Figure 5:
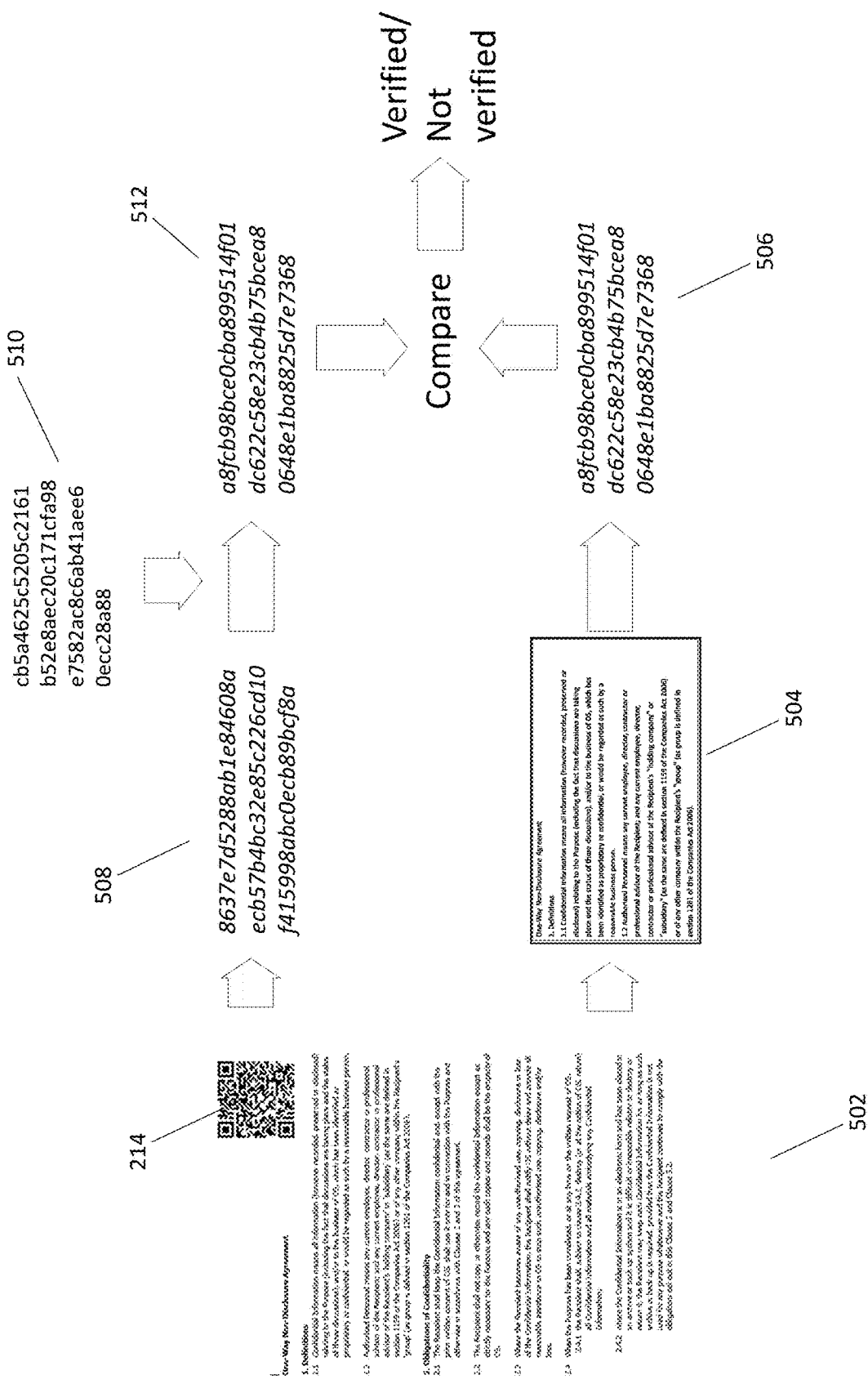
FIG. 5 is a diagram showing the steps of verifying the authenticity of a digitally signed document according to one or more illustrative aspects described herein.

A document that has been digitally signed can be verified/authenticated, as shown in FIG. 5. A digitally signed document is scanned so as to create an image 502 of the document, from which image data can be obtained. The image 502 includes a printed signature 214 on the document, in the form of a 1d or 2d barcode in the illustrated case. The image 502 is transformed and processed into simplified text data 504 using the methods described above. As outlined above, the extraction and simplification of the text data allows the contents of the document to be obtained, whilst being minimally affected, if at all, by the variability of the positioning or orientation of the scan, or by any ageing or wear on the document. A document digest 506 is then generated from the simplified text data 504. This document digest 506 is representative of the contents of the document at the time it was scanned.

In addition to the generation of the document digest 506, the signature digest 508 is extracted from the printed signature 214 on the document. A signing authority public key 510 is applied to the signature digest 508 so as to generate the original digest 512. The original digest 512 should be representative of the contents of the document at the time it was digitally signed, assuming that neither the document nor the signature have been tampered with.

The document digest 506 and the original digest 512 are compared with one another. If the document digest 506 and the original digest 512 match one another (e.g., they are identical), this is an indication that the document and signature have not been tampered with, and the document is verified. Such verification may be output to a user on a display. If the document digest 506 and the original digest 512 do not match one another, this is indication that at least one of the document and signature may have been tampered with, and the document is not verified. The result that the document is not verified and an indication that further investigation is necessary may be output to a user on the display. The mismatch may also be attributed to errors or discrepancies in the optical character recognition processing, a solution to which is presented below.

The approximate location of the mismatch(es) may also be displayed to the user by examination of which of the short hashes contained within the digest are mismatched with the short hashes generated from the lines of text or fields within the document. As described above, a short hash is generated for each line of text or field, and can therefore be mapped to specific locations within the document, for example, via the field markers 306a, 306b associated therewith.

This allow users, upon the determination that a document has not been verified, to review the specific mismatched text data generated by optical character recognition (or a similar process), as such software is prone to errors. The user may then correct any errors in the text data. If, following these corrections, the document still cannot be verified, this may be an indication that the document or signature has been tampered with.

Figures 6, 7:
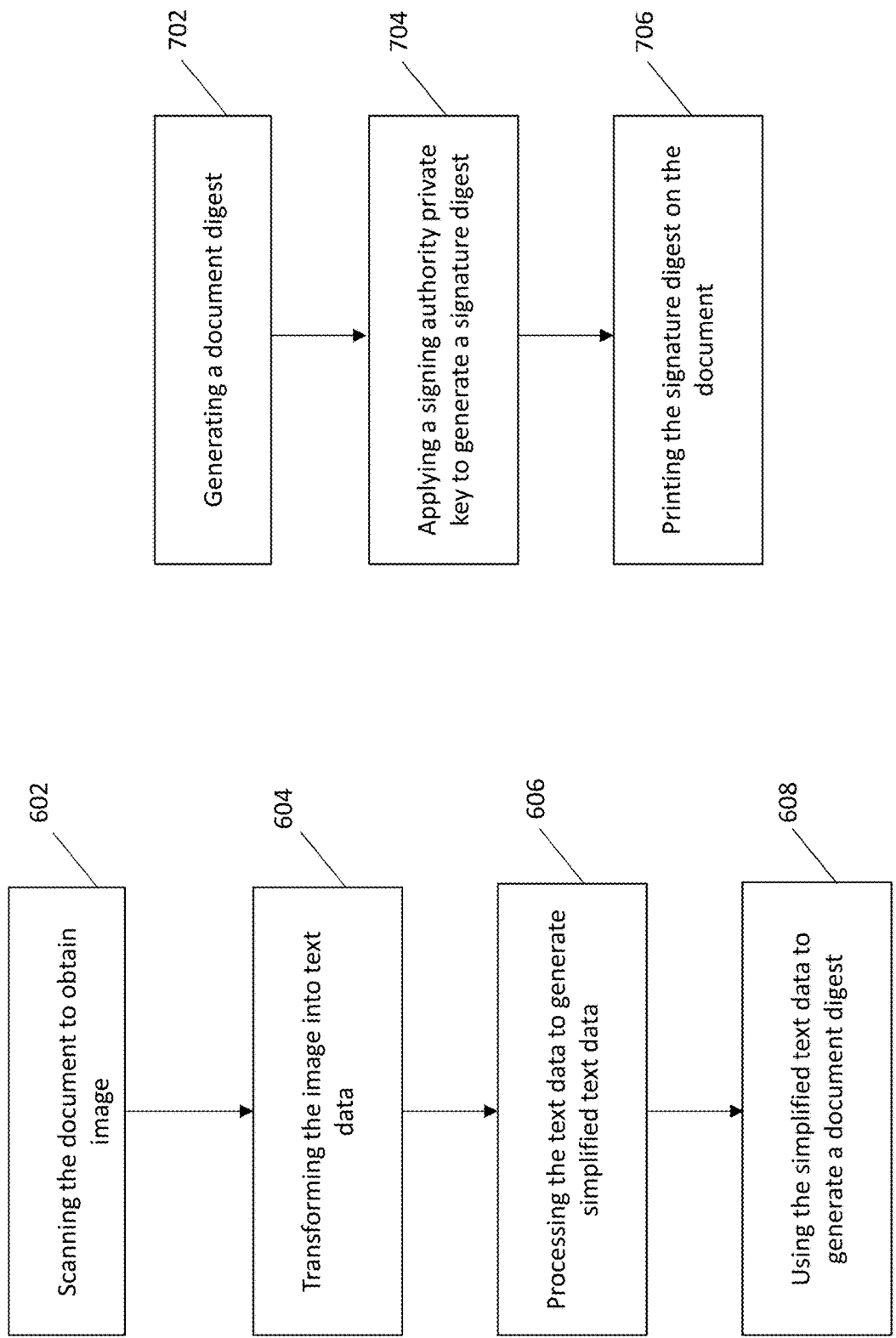
FIG. 6 is a flow chart illustrating a method of generating a document digest according to one or more illustrative aspects described herein.
FIG. 7 is a flow chart illustrating a method of digitally signing a document according to one or more illustrative aspects described herein.

FIG. 6 provides a summary of the method of generating a document digest, as discussed above. First, the physical document is scanned so as to obtain an image of the document (step 602). The image is the transformed into text data (step 604). The resulting text data is processed so as to generate simplified text data (step 606). The simplified text data is used to generate a document digest (step 608).

FIG. 7 provides a summary of the method of digitally signing a document. A document digest is generated (step 702), using the steps described above with reference to FIG. 6, for example. A signing authority private key is applied to the document digest to generate a signature digest (step 704). The signature digest is printed on the document (step 706), for example, in the form of a 2d barcode.

Figure 8:
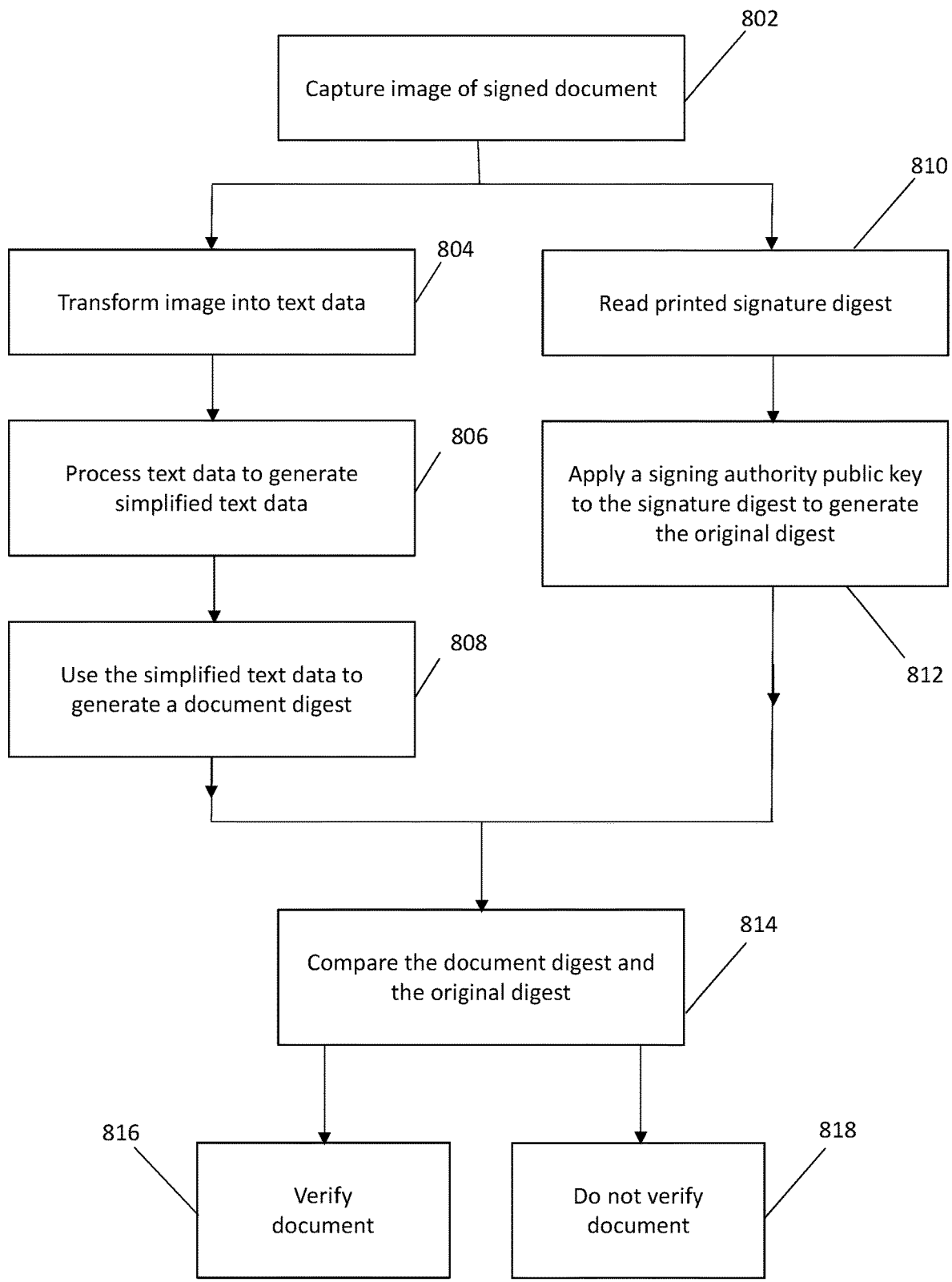
FIG. 8 is a flow chart illustrating a method of verifying a digitally signed document according to one or more illustrative aspects described herein.

FIG. 8 provides a summary of the method of verifying/authenticating a document that has been digitally signed. An image of the signed document is captured (step 802). The image is transformed into text data (step 804). The text data is processed to generate simplified text data (step 806). The simplified text data is used to generate a document digest (step 808). Additionally, the printed signature digest is read (step 810), whereby the signature digest is extracted. A signing authority public key is applied to the signature digest to generate the original digest (step 812). The document digest and the original digest are compared (step 814). If the new document digest and the original digest match one another, the document is verified as being the original document or an authentic copy thereof, that is to say, it has not been tampered with (step 816). If the document digest and the original digest do not match one another, the document is not verified as being the original document or an authentic copy thereof (step 818), suggesting that further investigation is necessary. If there is a mismatch, the new document digest and the original digest can be compared as described above to identify and locate the source of the mismatch, and thereby determine which information within the document has been changed.

In this respect, the process of simplifying the text data when generating the original digest and any later document digests for verifying a copy of the document ensures that the later recreations of the digest can take place from any scan of the document, even where the future scan is of a document that has been subject to wear and tear.

The methods described herein offer one further advantage that a document to be analysed can be scanned independently of perfectly accurate positioning. Instead of having to ensure that when a document is scanned, it is placed at exactly the same position and orientation in the scanner as for a previous scan, a document can be scanned in any new position, provided that its contents are visible.

Further, the document contents can be verified as being signed by a known certifying authority, and verified as having the same contents as they had at the point at which they were signed. Signature verification can take place without the involvement of the certifying authority who may, for example, no longer exist, or may have been compromised.

Although aspects have been described above with reference to one or more preferred embodiments, it will be appreciated that various changes or modifications may be made without departing from the scope of the disclosure as defined in the appended claims.

What is claimed is:

1. A computer-implemented method of creating a digest of a document, comprising:
    obtaining an image of the document;
    processing the image to obtain a plurality of datasets, each dataset comprising a line of text comprising a plurality of position independent values;
    encoding the plurality of datasets, wherein the encoding comprises reducing a number of position independent values for the respective datasets;
    generating a plurality of short hashes, each short hash corresponding to a respective encoded dataset, wherein the generating the plurality of short hashes comprises:
        applying a lossless compression to the respective dataset, and
        applying a 16-bit CRC checksum algorithm thereto; and
    generating a digest associated with the document therefrom, wherein the digest comprises the plurality of short hashes.

2. The method according to claim 1, wherein the digest further comprises position data associating the one or more short hashes with a respective dataset.

3. The method according to claim 1, wherein the encoding comprises converting the one or more datasets into a simplified format.

4. The method according to claim 1, wherein the encoding comprises one or more of: removal of styling; standardisation of commonly-confused characters; removal of excess white space; and enforcing consistent line termination.

5. The method according to claim 1, wherein the processing the image to obtain the one or more datasets comprises using optical character recognition.

6. The method according to claim 1, further comprising:
    applying a signing authority private key to the digest and generating a signature digest therefrom.

7. The method according to claim 6, comprising generating a visual representation of the signature digest, and printing the visual representation on the document.

8. The method according to claim 7, wherein the one or more short hashes are sufficiently short to generate a signature digest having a size suitable for printing as the visual representation on the document.

9. The method according to claim 7, wherein the visual representation comprises a 1-dimensional or a 2-dimensional barcode.

10. The method according to claim 1, wherein the plurality of short hashes corresponding to a respective encoded dataset are generated such that each respective short hash is collision resistant.

11. The method according to claim 10, wherein each respective short hash is sufficiently collision resistant to prevent fraudulent reproduction thereof.

12. A method of verifying a digitally signed document, comprising:
    obtaining an image of the document;
    processing the image to obtain a plurality of datasets, each dataset being a line of text comprising a plurality of position independent values;
    encoding the plurality of datasets, wherein the encoding comprises reducing a number of position independent values for the respective datasets;
    generating a plurality of short hashes, each short hash corresponding to a respective encoded dataset, wherein the generating the plurality of short hashes comprises:
        applying a lossless compression to the respective dataset, and
        applying a 16-bit CRC checksum algorithm thereto;
    generating a new digest associated with the document therefrom, wherein the new digest comprises the plurality of short hashes;
    retrieving a digital signature associated with the document;
    applying a public key to the digital signature to retrieve an original digest associated with the document, wherein the original digest comprises one or more further short hashes corresponding to one or more further datasets, wherein each of the one or more further datasets corresponds to a line of text in an original version of the document;
    comparing the new digest and the original digest; and
    verifying the document in dependence thereon.

13. The method according to claim 12, wherein the document is verified if the new digest matches the original digest; and wherein the document is not verified if the new digest does not match the original digest.

14. The method according to claim 13, wherein the document is not verified, the method further comprises identifying a location of a discrepancy between the one or more datasets and the one or more further datasets.

15. The method according to claim 13, wherein identifying the location of the discrepancy comprises comparing the one or more short hashes to the one or more further short hashes.

16. The method according to claim 12, wherein the plurality of short hashes corresponding to a respective encoded dataset are generated such that each respective short hash is collision resistant.

17. A system comprising:
    a processor; and
    a non-transitory computer readable medium storing one or more instruction(s) arranged such that when executed the processor is caused to:
        obtain an image of the document;

process the image to obtain a plurality of datasets, each dataset being a line of text comprising a plurality of position independent values;

encode the plurality of datasets, wherein the encoding comprises reducing a number of position independent values for the respective datasets;

generate a plurality of short hashes, each short hash corresponding to a respective encoded dataset, wherein the generating the plurality of short hashes comprises:

applying a lossless compression to the respective dataset, and applying a 16-bit CRC checksum algorithm thereto; and generate a digest associated with the document therefrom, wherein the digest comprises the plurality of short hashes.

18. The system according to claim 17, wherein the processor is further caused to generate the plurality of short hashes corresponding to a respective encoded dataset such that each respective short hash is collision resistant.

\* \* \* \* \*